United States Patent
Augsburg et al.

(10) Patent No.: US 7,725,684 B2
(45) Date of Patent: *May 25, 2010

(54) SPECULATIVE INSTRUCTION ISSUE IN A SIMULTANEOUSLY MULTITHREADED PROCESSOR

(75) Inventors: Victor R. Augsburg, Cary, NC (US); Jeffrey T. Bridges, Raleigh, NC (US); Michael S. Mcilvaine, Wake Forest, NC (US); Thomas Andrew Sartorius, Raleigh, NC (US); Rodney W. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 12/105,091

(22) Filed: Apr. 17, 2008

(65) Prior Publication Data
US 2008/0189521 A1  Aug. 7, 2008

Related U.S. Application Data (63) Continuation of application No. 10/664,384, filed on Sep. 17, 2003, now Pat. No. 7,366,877.

(51) Int. Cl.
    *G06F 9/30* (2006.01)
(52) U.S. Cl. .................... 712/214; 712/219
(58) Field of Classification Search ........... 712/214, 712/215, 216, 217, 218
    See application file for complete search history.

(56) References Cited

U.S. PATENT DOCUMENTS

| 5,404,469 A | 4/1995 | Chung et al. |
|---|---|---|
| 5,555,432 A | 9/1996 | Hinton et al. |
| 5,574,939 A | 11/1996 | Keckler et al. |
| 5,742,782 A | 4/1998 | Ito et al. |
| 5,809,325 A | 9/1998 | Hinton et al. |
| 5,842,036 A | 11/1998 | Hinton et al. |
| 5,848,256 A | 12/1998 | Call et al. |
| 5,864,341 A | 1/1999 | Hicks et al. |
| 5,870,580 A | 2/1999 | Walker |
| 5,872,947 A | 2/1999 | Narayan |

(Continued)

OTHER PUBLICATIONS

Heuring et al., "Computer Systems Design and Architecture", Reading, Massachusetts: Addison Wesley Longman, Inc., 1997. pp. 200-202 and 209.

(Continued)

*Primary Examiner*—Aimee J Li
(74) *Attorney, Agent, or Firm*—Yee & Associates, P.C.; Mark E. McBurney (57) ABSTRACT

A method for optimizing throughput in a microprocessor that is capable of processing multiple threads of instructions simultaneously. Instruction issue logic is provided between the input buffers and the pipeline of the microprocessor. The instruction issue logic speculatively issues instructions from a given thread based on the probability that the required operands will be available when the instruction reaches the stage in the pipeline where they are required. Issue of an instruction is blocked if the current pipeline conditions indicate that there is a significant probability that the instruction will need to stall in a shared resource to wait for operands. Once the probability that the instruction will stall is below a certain threshold, based on current pipeline conditions, the instruction is allowed to issue.

13 Claims, 6 Drawing Sheets

U.S. PATENT DOCUMENTS

| | | |
|---|---|---|
| 5,923,862 A | 7/1999 | Nguyen et al. |
| 5,933,627 A | 8/1999 | Parady |
| 5,958,041 A | 9/1999 | Petolino, Jr. et al. |
| 5,964,867 A | 10/1999 | Anderson et al. |
| 6,144,982 A | 11/2000 | Panwar |
| 6,360,315 B1 | 3/2002 | Potter |
| 6,393,550 B1 | 5/2002 | Fetterman et al. |
| 6,442,678 B1 | 8/2002 | Arora |
| 6,601,162 B1 | 7/2003 | Teruyama |
| 6,820,173 B1 | 11/2004 | Bittel et al. |
| 6,907,520 B2 | 6/2005 | Parady |
| 7,366,877 B2 * | 4/2008 | Augsburg et al. ........... 712/214 |
| 2003/0182536 A1 | 9/2003 | Teruyama |

OTHER PUBLICATIONS

Rosenberg, "Dictionary of Computers, Information Processing, and Telecommunications", Second Edition, New York, John Wiley & Sons, 1987, p. 66, term "buffer (BUF)".

Swanson et al., "An Evaluation of Speculative Instruction Execution on Simultaneous Multithreaded Processors", ACM Transactions on Computer Systems, Aug. 2003, pp. 314-340.

Loikkanen et al., "A Fine-Grain Multithreading Superscaler Architecture", IEEE 1996, pp. 163-168.

Brutscher et al., "Prediction Outcome History-based Confidence Estimation for Load Value Prediction", Journal of Instruction-Level Parallelism 1, 1999.

\* cited by examiner

SPECULATIVE INSTRUCTION ISSUE IN A SIMULTANEOUSLY MULTITHREADED PROCESSOR

This application is a continuation of application Ser. No. 10/664,384 filed Sep. 17, 2003, status allowed.

BACKGROUND OF THE INVENTION

The present invention relates generally to the field of computer processors and more specifically to increasing throughput in simultaneously multi-threaded processors.

A computer processor is the heart of any computer system. They are responsible for processing the instructions that make all of the functions of the computer possible. Computer processors are also called central processing units (CPU's) and microprocessors. A pipelined computer processor has multiple stages that each instruction must traverse during the processing phase. An exemplary five stage pipelined processor contains the following stages: fetch, decode, memory access, execute and write-back. During the fetch stage, an instruction is fetched from a register, or buffer. The instruction is decoded in the decode stage to determine the type of operation to be conducted, and what operand(s) are needed to complete the operation. The required operands are retrieved during the memory access stage and execution of the instruction occurs during the execute phase. The result of the executed instruction is then written back to memory during the write-back stage. Many processors have more than five stages and some processors have more than one pipeline. However, some features of pipelined processors are the same for all pipelines. Specifically, once an instruction enters a pipeline any stall caused by the instruction will cause the entire pipeline to stall. When the pipeline is stalled, no output is produced and performance drops. Thus, preventing pipeline stalls is an important factor in achieving optimal performance in microprocessors.

Microprocessors run on a timing schedule that is coordinated by a clock. The clock provides timing signals referred to as cycles. Movement of instructions, operands and results are preferably completed upon each clock cycle. A given stage within a pipeline, such as the execute stage, may take more than one clock cycle to complete. However, the execute stage is preferably broken into multiple sub-stages so that at the end of each clock cycle some output is produced and allowed to enter the next stage. In this way, the microprocessor produces some output at the end of each clock cycle. Both clock cycle and clock frequency can be used to describe the speed of the processor. A computer with a short clock cycle will have a high clock frequency. Generally, the higher the clock frequency the faster the computer, or more accurately, the faster the computer is able to process instructions.

A thread is a line, or stream, of computer instructions that when processed achieves some objective of the computer or the computer user. Simultaneously multithreaded processors allow for the execution of two or more potentially independent instruction streams concurrently. While only one instruction can occupy any one stage of a pipeline at a time, having instructions from other threads ready for processing increases system performance. To make most efficient use of the available hardware and avoid duplication of function, some pipeline resources are shared among all threads. For a given thread to occupy a shared resource, its instruction stream must at some point be merged with the instruction streams of the other threads. For the purpose of this application, the act of an instruction from any given thread merging into a shared pipeline resource is defined as "issue". After an instruction issues, a data dependency could cause it to stall in a shared resource until the dependency is resolved, stalling all threads which require the same resource. The impact of this problem is magnified in high frequency designs because the pipeline depth requires that the decision to issue a particular instruction be made one or more cycles before operand availability is known. This increases the chance of a dependent instruction stalling in a shared resource awaiting required operands. If instead, issue was delayed until operand availability was known, overall system performance would be negatively affected in cases where the operands would have been ready at the time the dependent instruction required them. Single threaded performance would also suffer due to the increased latency, while multithreaded performance and/or efficiency would suffer due to not utilizing every possible opportunity to issue an instruction from a given thread.

Prior attempts to remedy this problem involved blocking a thread with the dependency from issuing until its operand data is ready for forwarding. This was a suitable solution for lower frequency designs, but is not optimal for high frequency designs which must make the issue decision one or more cycles before operand availability is known due to the pipeline depth. Using this prior method in processors with a high clock frequency introduces penalty cycles to a specific thread's overall latency each time a dependency is encountered, since operand data can not be used as soon as it becomes available.

SUMMARY OF THE INVENTION

A method for issuing instructions in a simultaneous, multithreaded microprocessor. The microprocessor includes at least one multi-stage pipeline for processing instructions. The processor also includes a cache memory, multiple independent input buffers for each thread, and instruction issue logic. The instruction issue logic is in a position between the input buffers and the multi-stage pipeline. The method comprises the steps of receiving sets of instructions in the instruction issue logic at a rate equal to a clock rate of the microprocessor, wherein each set of instructions comprise one instruction from each of the independent input buffers. The instruction issue logic then predicts the pipeline stage in which the results of the each instruction will be available for forwarding. This pipeline stage information is then stored until the instruction reaches the predicted stage. The issue logic then identifies any dependent instruction that requires a result from a preceding instruction that is within a critical distance of the dependent instruction. The critical distance is equal to the number of stages between a stage when the dependent instruction will need the result and a stage when the result will be available. Based on the current contents of the pipeline, the instruction issue logic issues all instructions that have a probability above a predetermined threshold that the instruction will complete all stages of the pipeline without causing a stall. The instruction issue logic holds all instructions that have a probability below the predetermined threshold, wherein instructions held by the instruction issue logic are issued after their probability of not causing a stall in the pipeline rises above the threshold.

It is an object of the present invention to increase performance in simultaneous, multi-threaded microprocessor.

It is a further object of the invention to determine the probability of an instruction to cause a stall and speculatively issue instructions based on the determined probability.

BRIEF DESCRIPTION OF THE DRAWINGS

The invention of the present application will now be described in more detail with reference to the accompanying drawings, given only by way of example, in which.

DETAILED DESCRIPTION OF THE INVENTION

The solution described herein is to speculatively issue instructions from a given thread based on the probability that the required operands will be available when the instruction requires them. Issue of the instruction is blocked if the current pipeline conditions indicate that there is a significant probability that the instruction will need to stall in a shared resource waiting for operands. Once the probability that the instruction will stall is below a certain threshold, the instruction is allowed to issue.

Figure 1:
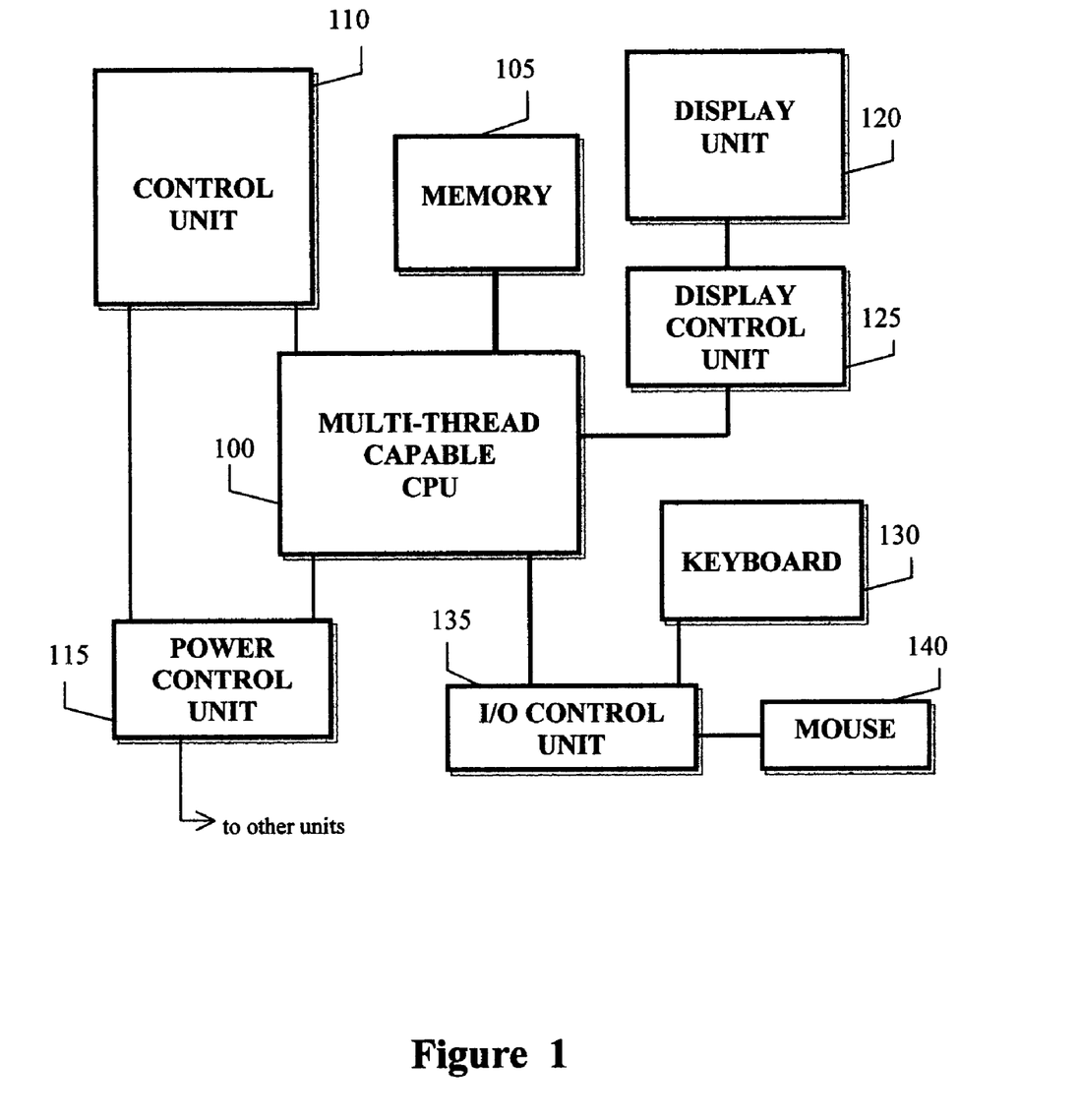
FIG. 1 is a block diagram of a computer system in which the present method can be employed.

FIG. 1 is a block diagram showing the major components of a computer system that can take advantage of the present method. Multi-thread capable CPU 100 is a microprocessor that is capable of processing multiple threads of instructions. Multi-thread CPU's are generally more efficient than single thread CPU and therefore provide better overall performance than CPU's that operate strictly on one instruction thread. CPU 100 is electrically connected to memory 105, control unit 110, power control unit 115, display control unit 125 and I/O control unit 135. Memory 105 is a random access memory (RAM) and can be differentiated from a cache memory by the fact that cache memory is located within CPU 100. Control unit 110 provides control signals to the multiple registers and buffers within CPU 100, which tell the registers when to accept and when not to accept new data. The control signals are synchronized with the system clock. The system clock is electrically connected to each component in FIG. 1, except power control unit 115. For clarity purposes these connections have not been shown. Power control unit 115 distributes power to each component in FIG. 1. Display control unit 125 receives display information from CPU 100 and controls how the information is displayed on display unit 120. I/O control unit 135 receives input from keyboard 130 and mouse 140 and converts the input into machine readable form before forwarding it to CPU 100. The I/O control unit 135 would also receive information from CPU 100 and convert that information into instructions for a printer, when a printer is connected to the system of FIG. 1.

Figure 2:
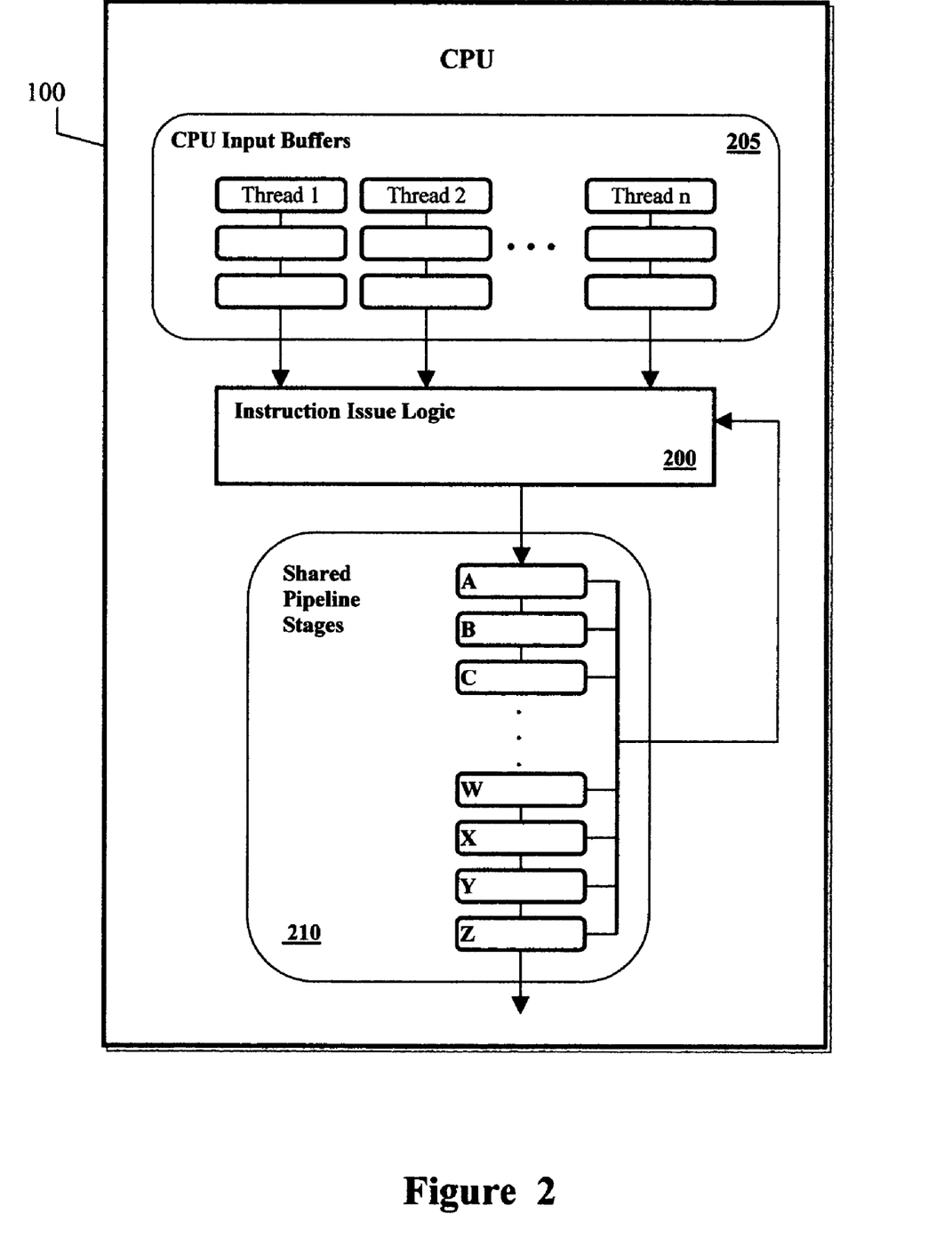
FIG. 2 is a schematic diagram of central processing unit with the present instruction issue logic.

FIG. 2 is a more detailed diagram of multi-thread CPU 100. CPU input buffers 205 provide temporary storage for three instructions from each of the multiple threads of instructions. Of course, there can be more or less than three buffers for each instruction stream in other embodiments. The first column of buffers holds three instructions from the first thread of instructions. The second column of buffers holds three instructions from the second thread of instructions. This temporary storage system repeats for as many columns of buffers that are present on the CPU, i.e., until the $n^{th}$ column of buffers is filled with instructions from the $n^{th}$ thread. The present instruction issue method is flexible and can be used with any number of threads that a CPU is capable of accepting. One instruction from each column of buffers enters instruction issue logic 200 where dependency problems for any instruction of that set are identified. If an instruction is found to require an operand that will likely not be available when the instruction needs it, then the thread that the instruction came from is withdrawn from the pool of candidates for issuing, wherein issuing means forwarding an instruction to the pipeline for processing. The thread of instructions that is least likely to cause a stall in the pipeline is then issued. That is not to say that the entire thread is guaranteed to traverse the pipeline without interruption. The instruction issue logic 200 evaluates a probability of causing a stall on every clock cycle in the preferred embodiment. Thus, if an instruction from a thread that is currently being processed is found to have a high probability of causing a stall, that thread will be delayed and an instruction from another thread will issue. When an instruction is issued, it enters the first stage "A" of the shared pipeline stages 210. Different pipelines have different numbers of stages and FIG. 2 is drawn to show that the present instruction issue logic is compatible with pipelines having any number of stages. A different operation is performed on the instructions at each stage of the pipeline 210. Stages A, B, C, W, X, Y, and Z are shared resources which may contain a mixture of instructions from different threads, however any one stage may contain only one instruction at any given time. The instruction issue logic 200 must choose appropriate instructions from the n threads to merge into the shared resources. In this example, instructions are required to resolve their dependencies before leaving stage B. In stage B, the operands on which the instruction is to operate are required. Stage Y represents the first opportunity in the pipeline that instruction results may be forwarded to dependent instructions in stage B. Thus, in this example, the pipeline has a "critical range" of four clock cycles, assuming there is a total of seven stages and each stage requires only one clock cycle. The critical range defines how long a dependent instruction must be delayed after issue of the instruction on which it depends before the dependent instruction can be issued without causing a stall in the pipeline. When the present method is applied to this example, an instruction with a dependency will be blocked from issuing until the instruction on which it depends reaches stage W. By delaying issue in this manner, the dependent instruction will reach stage B at the same time the instruction on which it depends reaches stage Y, assuming there are no pipeline holds. After issuing, the dependent instruction is able to proceed down the pipeline 210 without having to stall in any shared resources and having minimal impact on the execution of the other threads. This technique achieves the maximum multithreaded throughput. If issue of the dependent instruction were not delayed, the dependent instruction would reach stage B before the instruction on which it depends reached stage Y, causing the pipeline to stall and impacting the performance of all other threads. Blocking issue of the dependent instruction allows the other, unrelated threads, to use the "instruction slots" that otherwise would have been wasted by the dependent instruction blocking the pipe.

Figure 3:
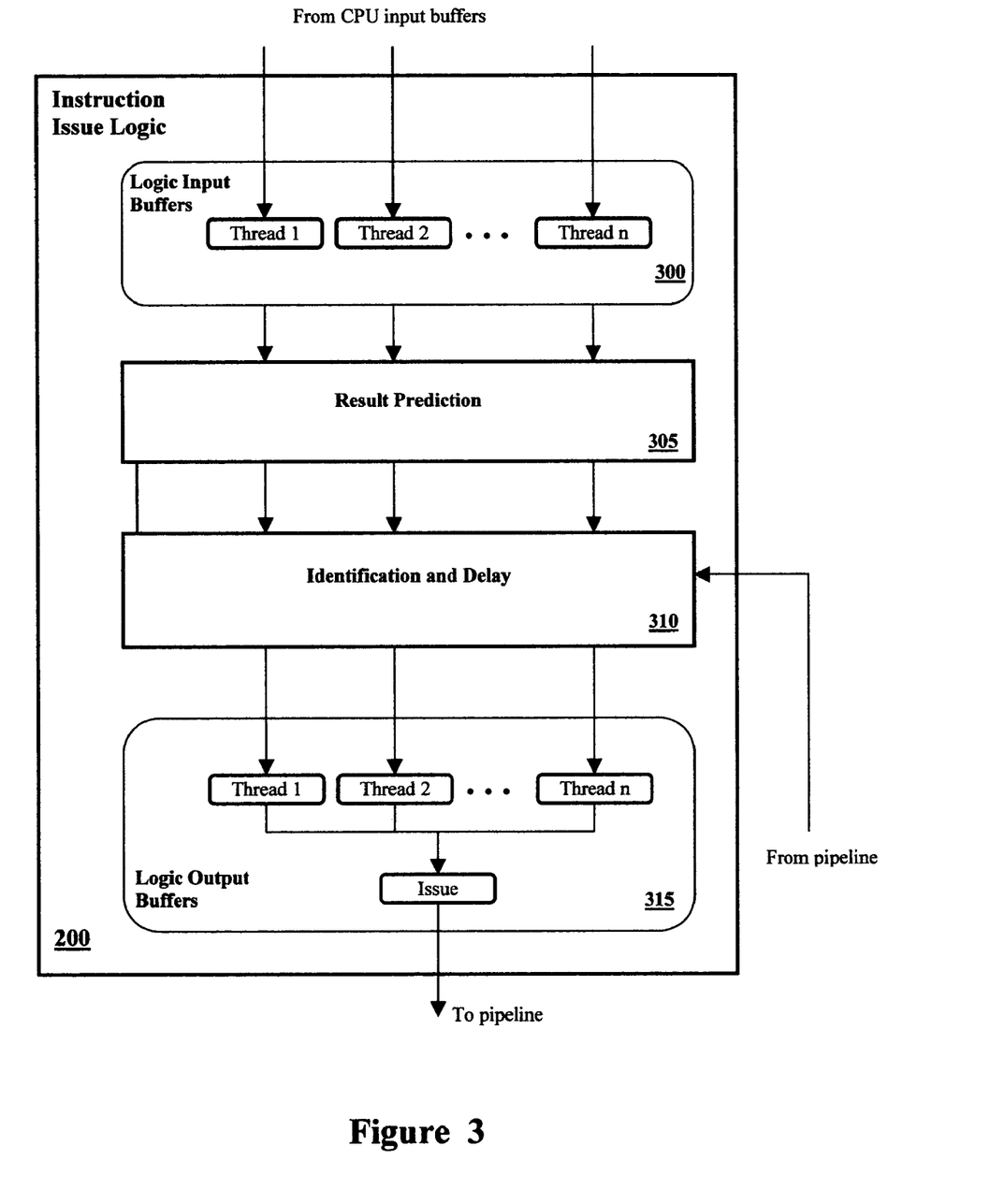
FIG. 3 is a block diagram of the present instruction issue logic.

FIG. 3 is a more detailed diagram of instruction issue logic 200. The instruction issue logic 200 has a number of input buffers 300 equal to the number of CPU input buffers. The input buffers 300 are connected to a result prediction unit 305 that predicts and temporarily stores the stage within the pipeline that each instruction will first have its results available for use by dependent instructions. The result prediction unit 305 also determines what resources each instruction will require during processing within the pipeline. In this way, conflicts over shared resources, such as a specific memory array, can also be avoided. The result prediction unit 305 is connected to identification and delay unit 310, which identifies dependent instructions and delays the dependent instructions until their operand sourcing instruction is no longer within the critical distance. The identification and delay unit 310 determines if a particular instruction should be delayed from issuing based on the current contents of the pipeline and information provided by the result and prediction unit 305. Identification and delay unit 310 also delays instructions that have a conflict over a shared resource such as a specific memory array. The last unit in the instruction issue logic contains the logic output buffers 315. The logic output buffers act as a multiplexer with "n" inputs and only one output, for single pipeline processors. In the preferred embodiment, all instructions in the output buffers 315 have been determined likely not to cause a stall in the pipeline. So the output buffers 315 simply act as a multiplexed FIFO (first in, first out) buffer. The instruction that is issued on each clock cycle from the output buffers 315 proceeds directly to the first stage of the pipeline to be processed.

Figure 4:
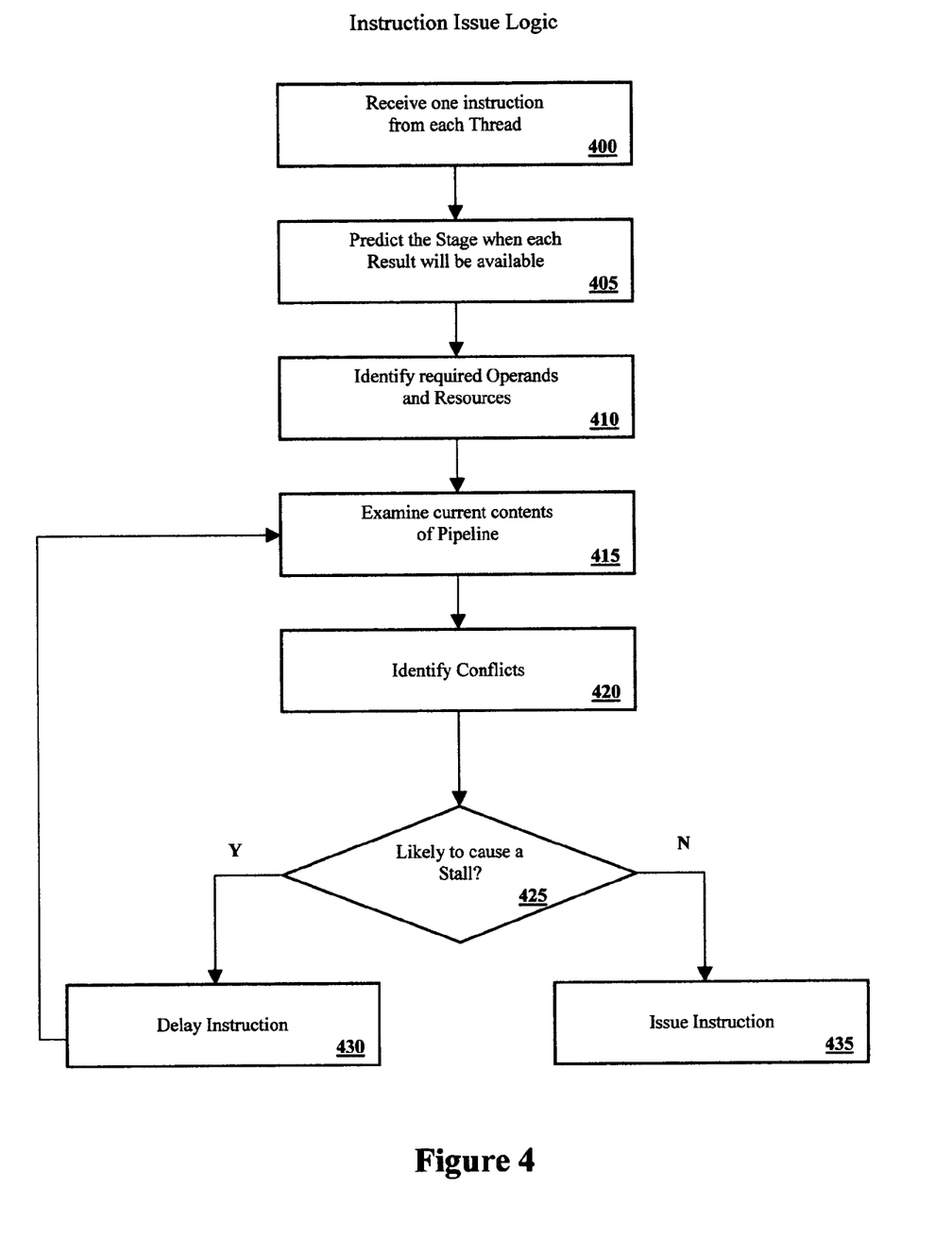
FIG. 4 is a general flow chart of the present method.

FIG. 4 is a flow chart showing the steps accomplished by the instruction issue logic. Preferably each step is executed in one clock cycle however, any step requiring more than one clock cycle can be broken into sub-steps so that an output is produced at the end of each clock cycle. In step 400 the issue logic receives one instruction from each thread of instructions in the CPU. In step 405 the stage an instruction must reach before their respective results will be available for forwarding is predicted. These predictions are used to determine whether or not a subsequent dependent instruction is within a critical range of the instruction. In the preferred embodiment, the predicted stage information is flushed after the instructions reach the stage in the pipeline where their results are available. Also, after instructions issue (enter the pipeline) the predicted stage information is updated, as frequently as each clock cycle, based upon the current contents of the pipeline. In step 410 the operands required by the instructions are identified, by at least partially decoding the instructions. In this way shared resource conflicts can also be identified. In step 415 the current content of the pipeline are examined and the information obtained therefrom is used to update stage predictions, operand availability and other shared resource conflicts, such as a specific memory. In step 420 instructions with potential conflicts are flagged so that the instruction issue logic can calculate a probability of causing a stall for those instructions. In step 425 the likelihood of causing a stall is determined. If the likelihood of causing a stall is below a threshold level, such as 50% for example, then the instruction is allowed to issue, step 435. If it is determined that the probability of causing a stall in the pipeline is above the threshold level, then the instruction is delayed one or more clock cycles, step 430. Instructions that are delayed are re-evaluated, as often as each clock cycle, and allowed to issue once the contents of the pipeline indicate the probability of causing a stall has dropped below the threshold level.

Figure 5:
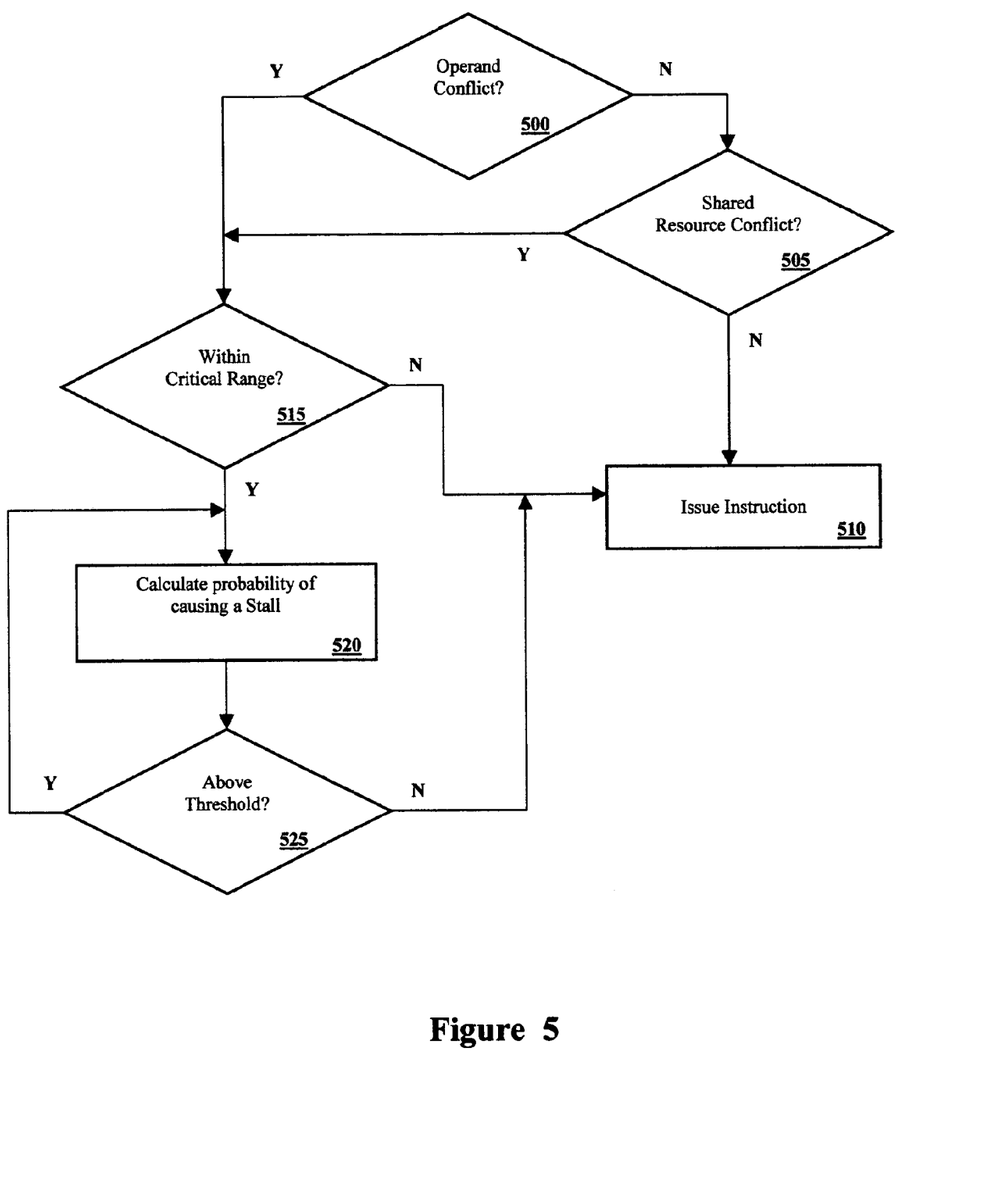
FIG. 5 is an exemplary decision tree for the present instruction issue logic; and, FIG. 6 shows the instruction issue logic in a processor with two pipelines.

FIG. 5 is flow chart showing the steps followed once an instruction has been flagged as having a potential conflict. In step 500 it is determined whether or not the potential conflict is an operand conflict. If there is no operand conflict, then it is determined whether or not there is a shared resource conflict, step 505. If there is not a shared resource conflict then the instruction is allowed to issue, step 510. If however, in step 500 or 505, it is determined that there is a conflict, then the instruction issue logic determines whether or not the two conflicting instructions are within a critical range of each other, step 515. Using the example of FIG. 2, which had a critical range for operand conflicts of four clock cycles, if the dependent instruction is four or more pipeline stages behind the instruction upon which it depends ("independent" instruction), then the dependent instruction is allowed to issue, step 510. If however, the dependent instruction is less than four stages behind the "independent" instruction, then the probability of causing a stall must be calculated. The critical range for shared resource conflicts will be one or more clock cycles less than the critical range for operand conflicts, depending upon the resource involved. In step 520 the probability of causing a stall in the pipeline is determined based on the critical range and the current contents of the pipeline. In step 525 the probability is compared to a threshold value, which can vary. If the probability is below the threshold the instruction is allowed to issue. If, however, the probability of causing a stall is above the threshold then the instruction is delayed. Delayed instructions can have their probability recalculated every clock cycle. When the probability of causing a stall finally drops below the threshold, the instruction is allowed to issue.

Figure 6:
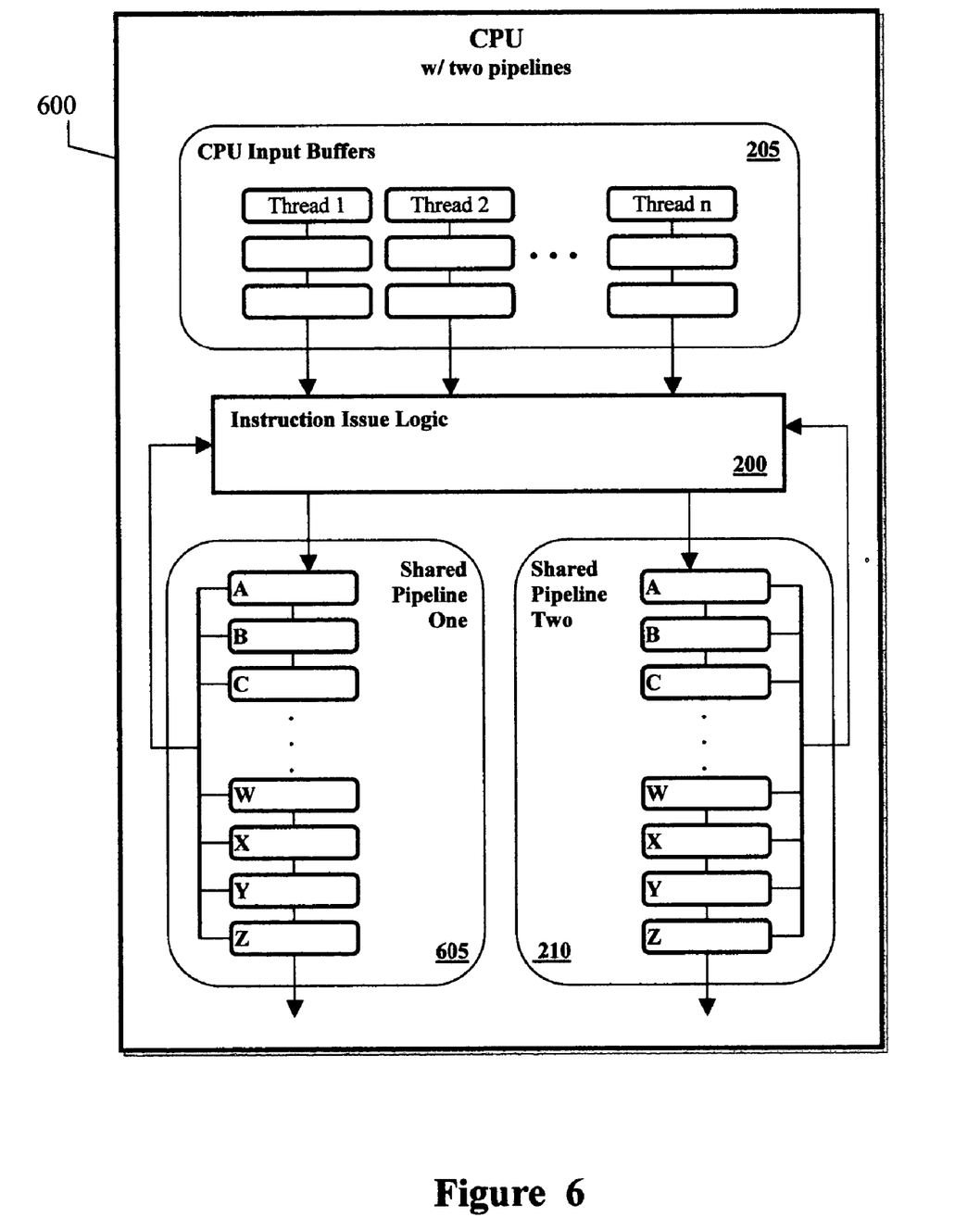

FIG. 6 shows the present instruction issue logic 200 in operational position in a CPU 600 that has two instruction pipelines 210 and 605. In this embodiment, the instruction issue logic 200 still receives multiple instructions, from multiple threads, from the CPU input buffers 205. However, the instruction issue logic 200 issues two instructions on every clock cycle, so that each pipeline 210 and 605 receives an instruction for processing on every clock cycle. The instruction issue logic in this embodiment takes into account the contents of two pipelines when determining probabilities of causing a stall.

Minimum latency for single threaded microprocessors can also be achieved by using the present method. Speculatively issuing the dependent instruction based on the probability that its operands will be available improves single threaded performance by issuing instructions at the "optimal" time. Blocking the issue of the dependent instruction until there is a high probability that its operands will be available incurs no penalty to the thread with the dependency. Instructions that are speculatively issued are still able to use their operands at the precise time they become available. By allowing the processor to make use of every possible issue opportunity where progress on the given thread can be made reduces the overall latency of all instruction streams that are in progress, improving both multithreaded and single threaded performance.

Given that instructions are speculatively allowed to issue based on certain predictions, it is possible for the prediction to be incorrect. An example of this case is the issue of an instruction that is dependent on a cacheable load. To keep single threaded latency as low as possible, an instruction may be speculatively issued assuming the load it is dependent on will be a cache hit. If after the time of issue, it is recognized that the load is a cache miss, the dependent instruction would be forced to wait in the shared resources until the cache miss is resolved.

The foregoing description of the specific embodiments will so fully reveal the general nature of the invention that others can, by applying current knowledge, readily modify and/or adapt for various applications such specific embodiments without departing from the generic concept. Therefore, such adaptations and modifications should and are intended to be comprehended within the meaning and range of equivalents of the disclosed embodiments. It is to be understood that the phraseology of terminology employed herein is for the purpose of description and not of limitation.

We claim:

1. A simultaneous multithreaded computer processor with speculative instruction issue that increases throughput, the computer processor comprising:

multiple independent input buffers, wherein one set of buffers is provided for each of a plurality of independent threads of instructions;

instruction issue logic that has an output buffer and is connected to the independent input buffers, wherein the instruction issue logic:

receives a set of instructions comprising one instruction from each of the threads of instructions;

identifies as dependent instructions those received instructions that require a result from a prerequisite instruction;

determines a probability for each instruction that the each instruction will complete all stages of a multi-stage instruction pipeline of the processor without causing a stall, wherein the probability for each received instruction is expressed as a percentage value;

selects the received instruction of the set that is least likely to cause a stall in the multi-stage pipeline; and issues the selected instruction into the pipeline for processing, from the instruction issue logic, when the probability for the selected instruction is above a predetermined threshold that is 50%; and wherein a first stage of the multi-stage pipeline is connected to an output buffer of the instruction issue logic.

2. The computer processor of claim 1, wherein the instruction issue logic determines whether there is a shared resource conflict between two or more of the received instructions.

3. The computer processor of claim 2, wherein the instruction issue logic resolves a given one of said shared resource conflicts, between two or more of said received instructions, after said given conflict has been discovered.

4. The computer processor of claim 1, wherein the instruction issue logic predicts a stage, within the multi-stage instruction pipeline, where results of each instruction will be available, and determines the probability for a dependent instruction by calculating a critical distance comprising a number of stages between a stage when the dependent instruction will need a given result, and a stage when the result will be available.

5. The computer processor of claim 1, wherein the instruction issue logic further identifies as dependent instructions those received instructions that have a conflict over a shared resource within a computer system in which the computer processor operates.

6. The computer processor of claim 5, wherein the probability for a dependent instruction is determined based upon a current location and a predicted stage of any prerequisite instruction and upon a predicted resolution of any identified shared resource conflict.

7. The computer processor of claim 6, wherein the instruction issue logic dynamically recalculates the probability for each instruction based on current contents of the pipeline and a current status of any shared resources.

8. A computer program product in a computer readable medium for issuing instructions in a multithreaded computer processor, wherein the computer program product comprises:

first instructions for receiving a set of computer instructions in an instruction issue logic, wherein each instruction of said set comprises one instruction from each of a plurality of independent instruction threads;

second instructions for identifying as dependent instructions those received instructions that require a result from a prerequisite instruction;

third instructions for determining a probability for each received instruction that the received instruction will complete all stages of a multi-stage instruction pipeline of the processor without causing a stall, wherein the probability for each received instruction is expressed as a percentage value;

fourth instructions for selecting the received instruction of the set that is least likely to cause a stall in the multi-stage pipeline; and fifth instructions for issuing the selected instruction into the pipeline for processing, from the instruction issue logic, when the probability for the selected instruction is above a predetermined threshold that is 50%.

9. The computer program product of claim 8, further comprising:

sixth instructions for determining whether there is a shared resource conflict between two or more of the received instructions of said set.

10. The computer program product of claim 9, wherein a given one of said shared resource conflicts, between two or more of said received instructions, is resolved after said given conflict has been discovered.

11. The computer program product of claim 8, further comprising:

seventh instructions for predicting a stage, within the multi-stage instruction pipeline, where results of each instruction will be available, and determining a probability for a received instruction by calculating a critical distance comprising a number of stages between a stage when the received instruction will need a given result, and the stage when a result will be available.

12. The computer program product of claim 11, wherein the probability for a dependent instruction is determined based upon a current location and a predicted stage of any prerequisite instruction and upon a predicted resolution of any identified shared resource conflict.

13. The computer program product of claim 12, wherein the probability for each instruction is dynamically recalculated, based on the current contents of the pipeline and a current status of any shared resources.

* * * * *